United States Patent
Eyer (10) Patent No.: US 8,015,613 B2
(45) Date of Patent: Sep. 6, 2011

(54) SYSTEM RENEWABILITY MESSAGE TRANSPORT

(75) Inventor: Mark Kenneth Eyer, Woodinville, WA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1096 days.

(21) Appl. No.: 11/229,225

(22) Filed: Sep. 16, 2005

(65) Prior Publication Data

US 2006/0064760 A1    Mar. 23, 2006

Related U.S. Application Data (60) Provisional application No. 60/611,118, filed on Sep. 17, 2004.

(51) Int. Cl.
G06F 7/04 (2006.01)

(52) U.S. Cl. ............ 726/26; 380/201; 380/217; 726/27

(58) Field of Classification Search .............. 726/26–27, 726/32; 713/158, 160; 386/94; 380/255, 380/200–242; 370/392
See application file for complete search history.

(56) References Cited

U.S. PATENT DOCUMENTS

| | | | | |
|---|---|---|---|---|
| 6,718,374 | B1 * | 4/2004 | Del Sordo et al. ............ | 709/220 |
| 2002/0188567 | A1 * | 12/2002 | Candelore ........................ | 705/51 |
| 2003/0135730 | A1 * | 7/2003 | Szucs et al. ...................... | 713/153 |
| 2004/0088549 | A1 * | 5/2004 | Ukai et al. ....................... | 713/175 |
| 2004/0101138 | A1 * | 5/2004 | Revital et al. .................. | 380/210 |
| 2004/0205554 | A1 | 10/2004 | Goswami et al. | |
| 2005/0021941 | A1 * | 1/2005 | Ohmori et al. ................ | 713/156 |
| 2005/0021942 | A1 | 1/2005 | Diehl et al. | |
| 2005/0022227 | A1 | 1/2005 | Shen et al. | |
| 2005/0050321 | A1 | 3/2005 | Murakoshi | |
| 2006/0053494 | A1 * | 3/2006 | Kamperman et al. .......... | 726/27 |
| 2006/0171391 | A1 * | 8/2006 | Suzuki ........................... | 370/392 |
| 2006/0191015 | A1 | 8/2006 | Foster et al. | |
| 2007/0011116 | A1 * | 1/2007 | Vauclair ......................... | 706/16 |
| 2008/0148067 | A1 | 6/2008 | Sitrick et al. | |

OTHER PUBLICATIONS

ATSC, "ATSC Direct-to-Home Satellite Broadcast Standard", Jul. 30, 2003, Published by Advanced Television Systems Committee, p. 12-13.*
"PSIP: Program & System Information Protocol", Chapter 3, by Mark Eyer (McGraw-Hill, Sep. 3, 2002) 72 pages.
"MPEG Systems Standard"; International Standard 13818-1(2000) 171 pages.
International Search Report for PCTUS2009065220 mailed Jul. 5, 2010.
U.S. Appl. No. 12/274,106, filed Nov. 19, 2008.

* cited by examiner

*Primary Examiner* — Hosuk Song
*Assistant Examiner* — Chi Nguy
(74) *Attorney, Agent, or Firm* — Fitch, Even, Tabin & Flannery (57) ABSTRACT

System renewability message data is transmitted to set top boxes, or other devices, using a protocol such as an MPEG-2 Systems type transport protocol. The system renewability message data is incorporated by a content provider or distributor directly into a MPEG-type transport packet stream. A data structure within a transport multiplex carries information pertinent to the system renewability message data. A plurality of packets is selected from the MPEG-type transport stream wherein the packets include data corresponding to identities of a plurality of devices that are unauthorized for the use of content. Each packet comprises an identifier that is referenced from a transport stream description table. The data from the plurality of packets is processed whereupon use of the content is prevented in accordance with the data.

21 Claims, 6 Drawing Sheets

Transport Stream Description Table (TSDT) section

600

| Syntax | No. of bits | Mnemonic |
|---|---|---|
| TS_description_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     reserved | 18 | bslbf |
|     version_number | 5 | uimsbf |
|     current_next_indicator | 1 | bslbf |
|     section_number | 8 | uimsbf |
|     last_section_number | 8 | uimsbf |
|     for (i = 0; i < N; i++) { | | |
|         descriptor()  602 | | |
|     } | | |
|     CRC_32 | 32 | rpchof |
| } | | |

FIG. 6

Conditional Access Table (CAT) section

700

| Syntax | No. of bits | Mnemonic |
|---|---|---|
| CA_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     reserved | 18 | bslbf |
|     version_number | 5 | uimsbf |
|     current_next_indicator | 1 | bslbf |
|     section_number | 8 | uimsbf |
|     last_section_number | 8 | uimsbf |
|     for (i = 0; i < N; i++) { | | |
|         descriptor()  702 | | |
|     } | | |
|     CRC_32 | 32 | rpchof |
| } | | |

FIG. 7

SRM Table section

| Syntax | No. of Bits | Format |
|---|---|---|
| system_renewability_message_table_section () { | | |
| table_id | 8 | TBD |
| section_syntax_indicator | 1 | '1' |
| private_indicator | 1 | '1' |
| reserved | 2 | '11' |
| section_length | 12 | uimsbf |
| CP_provider_id | 16 | uimsbf |
| reserved | 2 | '11' |
| version_number | 5 | uimsbf |
| current_next_indicator | 1 | bslbf |
| section_number | 8 | uimsbf |
| last_section_number | 8 | uimsbf |
| protocol_version | 8 | uimsbf |
| for(j=0; j<N; j++) { | | |
| SRM_data() | | |
| } | | |
| CRC_32 | 32 | rpchof |
| } | | |

SYSTEM RENEWABILITY MESSAGE TRANSPORT

CROSS REFERENCE TO RELATED APPLICATIONS

This claims priority from U.S. Provisional Application No. 60/611,118, filed Sep. 17, 2004.

FIELD OF INVENTION

The present invention is related to transmitting and receiving digital video audio, and data and, in particular, to transmitting and receiving digital video, audio and data in accordance with the MPEG-2 (ISO/IEC 13818-1) Systems standard.

BACKGROUND

Content protection technologies are used to establish and manage digital rights, such as the right to make copies, or to distribute content via the Internet. Certain consumer electronic devices are capable of receiving and rendering or otherwise using media content. Many content owners want to be assured that device vendors will manage and protect this content against unauthorized use. Digital rights management ("DRM") systems are used to manage the content and may be incorporated in licenses related to the use of protected content.

Security measures required for a device or application are laid out in "Robustness Rules." They dictate the security requirements, including the prevention of widely available and specialized attack tools from accessing restricted content data. For many applications, these requirements mean integrating specialized security techniques focused on the prevention of these attacks. Key hiding, obfuscation, code signing, executable encryption and anti-debug all act as defenses within and around the application, securing the content to the application and ensuring revenue protection for content owners and distributors.

In spite of these robustness rules that licensed products are required to follow, secret device keys may be extracted from certain devices by unauthorized persons, or keys may be stolen from production facilities. A copy protection technology provider often can learn the identities of cloned or stolen units, usually by buying a pirated unit. Units built using stolen or extracted keys usually are not authorized to handle protected content, because typically these units disregard provisions of the applicable DRM restrictions, and would allow (for example) unlimited copying of content, and distribution via the Internet.

Some copy protection technology providers currently include DTCP (Digital Transmission Copy Protection) used for IEEE 1394 links, and HDCP (High-bandwidth Digital Copy Protection) used to protect uncompressed digital video traveling on DVI (digital visual interface) or HDMI (high definition multi-media interface) links.

In order to disable or "revoke" units built from stolen or cloned certificates, system renewability messages, or "SRMs," are distributed along with content that is delivered on terrestrial broadcast, satellite, and cable media. SRMs are also sometimes known as "revocation lists" and may comprise lists containing the identities of illegal units. Each copy protection provider may generate a list of units no longer authorized to handle content according to that particular provider's technology. SRMs therefore may include multiple revocation lists, one list or set for each copy protection technology provider.

What is needed therefore are efficient systems and methods whereby SRMs can be distributed as part of or along with protected content, so that a receiving device can discover the presence of SRMs with the content and process the data appropriately, or as required by terms of a license.

SUMMARY OF THE ILLUSTRATED EMBODIMENTS

Embodiments of the invention are directed to the transmission of SRMs to set top boxes, or other devices, using a transport protocol such as MPEG-2 Systems (ISO/IEC 13818-1). In accordance with one embodiment, SRM data is incorporated by a content provider or distributor directly into packets within an MPEG-2-type Transport Stream. In particular, a Transport Stream Description Table is used to carry information pertinent to the SRM data which, in turn, is contained within another table.

In another embodiment, a plurality of packets are selected from an MPEG-2 type transport stream wherein the packets include data corresponding to identities of a plurality of devices that are unauthorized for the use of content. Each packet comprises an identifier that is referenced in a table. This data from the plurality of packets is processed. Use of the content is prevented in accordance with the data.

In one aspect, the table comprises a Transport Stream Description Table having an MPEG-type Registration Descriptor carrying a format_id value. The format_id value is registered with a registration authority such as the one cited by MPEG for registering values of format_id in the MPEG-2 Registration Descriptor, i.e, the Society of Motion Picture and Television Engineers (SMPTE).

In another aspect, the plurality of packets further includes data that form a second table having an MPEG-2 type long-form table section syntax and having data corresponding to the identities of the plurality of devices. The second table includes a value that is registered with an established registration authority and that corresponds to the identity of a provider of a copy protection technology.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Embodiments of the invention are directed to the transmission of SRMs to set top boxes, or other devices, using a transport protocol such as an MPEG-2-type protocol. In accordance with one embodiment, SRM data is incorporated by the content provider or distributor directly into a MPEG-2-type transport packet stream. In particular, a Transport Stream Description Table is used to carry information pertinent to the SRM data which, in turn, is contained within another table. For purposes of discussion herein, embodiments of the present invention may be described in terms of the MPEG-2 Systems standard. However, the present invention may be applicable to other versions of MPEG and to other types of audio/video (A/V) streams.

Source material (or a program), such as movies, sports, news, and music typically includes video, audio, and other associated data. This data is commonly formatted for storage and transmission into a video elementary stream (video ES) and one or more audio elementary streams (audio ES) according to MPEG-2 Systems Standard ISO/IEC 13818-1 (2000). The video ES and the audio ES, in turn, are packetized into a video packetized elementary stream (video PES) and one or more audio packetized elementary streams (audio PES). The video PES, audio PES, and associated data are multiplexed into a Transport Stream (TS), which may be delivered to a receiving device, such as a television set or a set top box, via cable, satellite, Digital Versatile Disc (DVD) player, or terrestrial broadcast.

Each MPEG-2 Transport Stream (TS) may carry several programs, each of which is made up of one or more program elements. Each program element is packetized for delivery into Transport Stream packets. Each Transport Stream packet is a 188-byte structure made up of a four-byte header and a payload of up to 184 bytes. The TS packet header includes a thirteen-bit Packet Identifier (PID), which is a unique integer value associated with each program element. All packets in a particular program element have the same PID value.

The identities of the video and audio elementary streams (ES) are defined by descriptive information called Program Specific Information (PSI) included in the Transport Stream (TS). PSI tables contain information needed by receiving devices to demultiplex and present programs. The PSI includes a Program Association Table (PAT), a Program Map Table (PMT), and optionally, a Conditional Access Table (CAT) and a Transport Stream Description Table (TSDT).

The PAT provides the association between a program number and the Packet Identifier (PID) value of the Transport Stream (TS) packets carrying a Program Map Table for that program. The PMT provides the mappings between program numbers and the program elements that make up the program. The PMT lists the elementary stream (ES) components, the "stream type" of each component (e.g., audio stream, video stream, data stream, etc.), and the Packet Identifier (PID) value associated with each elementary stream (ES). The CAT is an optional table that is typically used to identify TS packets carrying Entitlement Management Messages (EMMs) used in the management of conditional access to programming. The TSDT is another optional table that is used to store information that is relevant to all programs within the TS multiplex.

Figure 1:
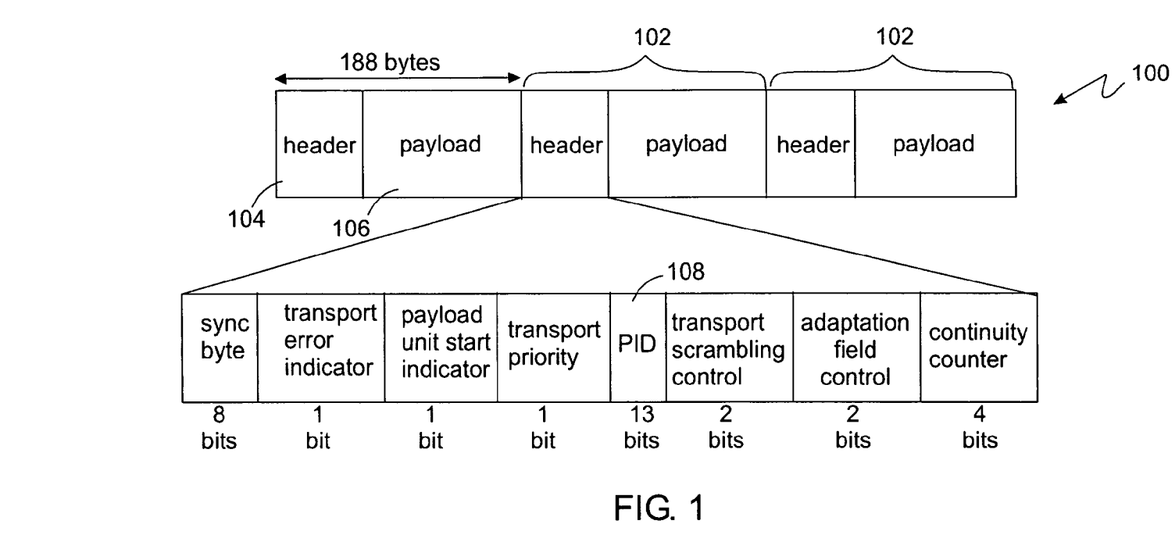
FIG. 1 is a high level block diagram of an MPEG-2-type transport stream.

FIG. 1 is a diagram of the MPEG-2 Transport Stream (TS) 100, which includes a series of 188-byte transport packets 102, each of which includes a 4-byte header 104 and a 184-byte payload 106. Each header 104 includes, among other things, a 13-bit Packet Identifier (PID) 108 that is used to label the packets in the multiplex and associate them with particular Elementary Streams (ES) or PSI data in the multiplex. As previously described, the Transport Stream (TS) 100 also includes Program Specific Information (PSI), such as Program Association Table (PAT) data, Program Map Table (PMT) data, Conditional Access Table (CAT) data, and Transport Stream Description Table (TSDT) data, as part of the payload of certain packets which are multiplexed with the packetized elementary streams (PES).

A receiving device receives the Transport Stream (TS), delivers the video portion of the program to a video subsystem such as a display (e.g., television screen), and delivers the audio portion to an audio subsystem such as a decoder/amplifier, a powered loudspeaker, or headphones.

Figure 5:
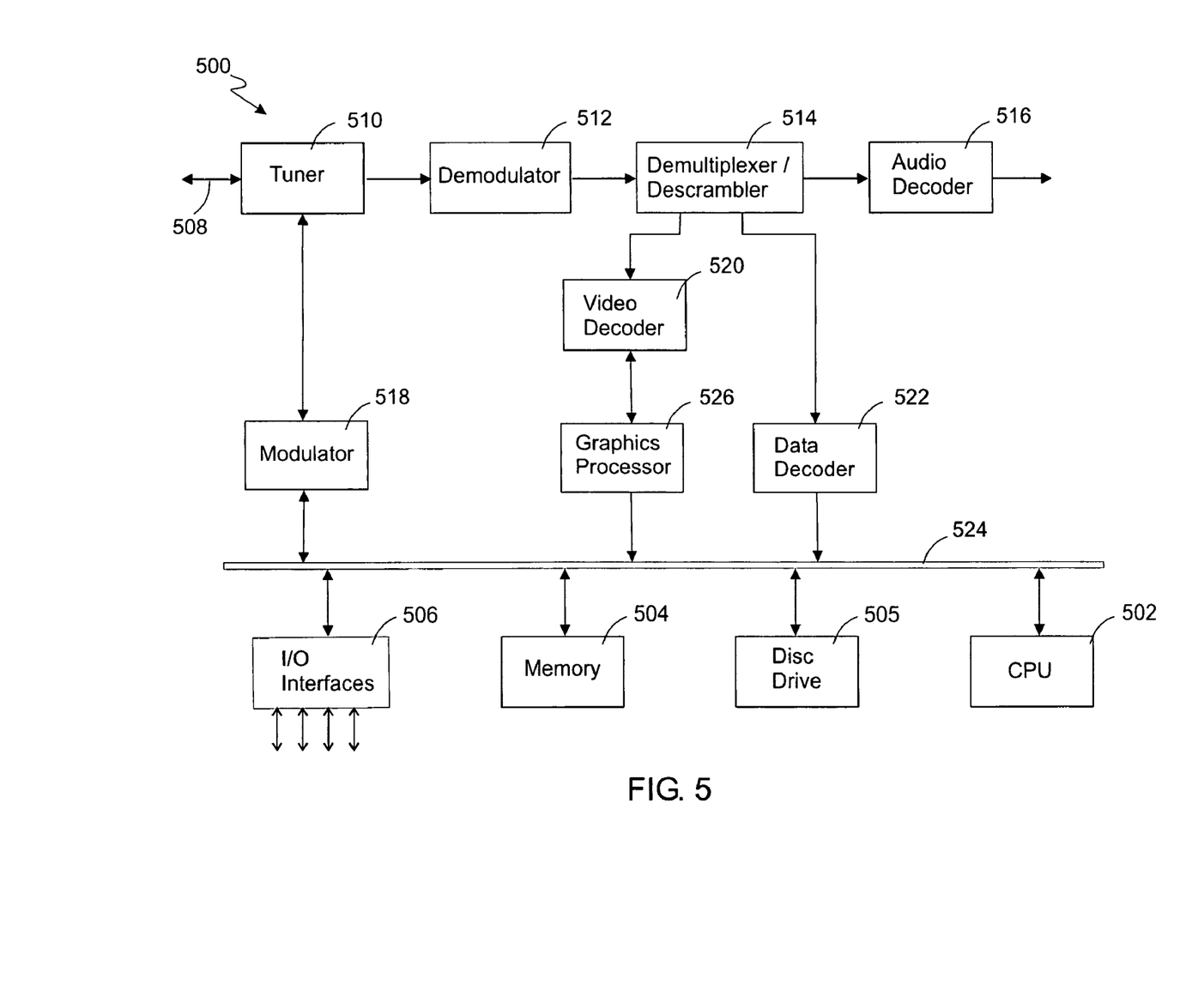
FIG. 5 is a high level block diagram of a receiving device for use of content.

An exemplary receiving device is shown in FIG. 5 as a set top box 500. The set top box 500 includes a central processing unit (CPU) 502 and memory 504 (such as Random Access Memory (RAM), Read Only Memory (ROM), or flash memory), and a disc drive 505, such as a hard disc drive, floppy disc drive, optical disc drive or may accommodate other mass storage or electronic storage media. Such memory and storage media are suitable for storing data as well as program instructions for processes to be executed by the CPU 502. Information and programs stored on the electronic storage media or memory may also be transported over any suitable transmission medium.

The set top box 500 includes circuitry suitable for audio decoding and processing, the decoding of video data compressed in accordance with a compression standard such as the Motion Pictures Experts Group (MPEG) standard and other processing. It is noted that these components may be incorporated into a television (not shown), thus eliminating the set top box 500. In addition, a computer may substitute for the television or the set top box 500 or both. The computer may include a variety of devices capable of generating video media including a tuner card coupled to a digital network, cable television network, or DSS (digital satellite system) network.

The set top box 500 may be coupled to additional devices such as a personal computer, video cassette recorder, camcorder, digital camera, personal digital assistant and other audio/visual or Internet related devices (not shown). In addition, a data transport architecture, such as that known as the Home Audio-Video Interoperability ("HAVi") architecture may be used to enable interoperability among devices on a network regardless of the device manufacturer. This architecture may be used to create a home network system between electronic devices and Internet appliances. The set top box 500 may run an operating system suitable for a home network system.

The set top box 500 includes input/output interfaces 506 that may be used with any device suitable for controlling the set top box 500, such as a remote control, an infrared receiver, a wireless radio frequency receiver, a wired connection interface, a personal digital assistant, a laptop computer, a keyboard, or a computer mouse. In addition, an input device in the form of a control panel (not shown) located on the television or the set top box 500 can be provided.

The set top box 500 may also be coupled to an Internet service provider (ISP) host by a suitable connection including dial-up connections, DSL (Digital Subscriber Line) or a transmission medium 508 (e.g. using a cable modem) connected to a tuner 510 to provide access to services and content from the ISP and the Internet. The set top box 500 may also be used as an Internet access device to obtain information and content from remote servers via the Internet. In certain satellite set top box environments, the data can be downloaded at very high speed from a satellite link, with asymmetrical upload speed from the set-top box provided via a dial-up or DSL connection.

Still referring to FIG. 5, the set top box 500 further includes a demodulator 512, a demultiplexer/descrambler 514, an audio decoder 516, a modulator 518, a video decoder 520, a data decoder 522, a system bus 524, and a graphics processor 526. The transmission medium 508, such as a coaxial cable or off-air broadcast antenna, is coupled by a suitable interface to the tuner 510. The tuner 510 may include a broadcast in-band tuner for receiving content, and for cable, an out-of-band ("OOB") tuner for receiving data transmissions and a return path tuner for providing an OOB return path for outbound data. A separate tuner (not shown) may be provided to receive conventional RF broadcast television channels.

The demodulator 512 may demodulate any modulated information from the tuner 510 such as MPEG-2 formatted data. The demultiplexer/descrambler circuit 514 separates the demodulated information into discrete streams of audio, video, and related data. The programming is divided into packets, each packet bearing a Packet ID (PID) value that identifies the packet as containing a particular type of data (e.g. audio, video, and data). The demultiplexer/descrambler circuit 514 also decrypts encrypted information in accordance with a decryption algorithm to prevent unauthorized access to programming content, for example.

Audio packets from the demultiplexer/descrambler circuit 514 (those identified with an audio PID) are decrypted and forwarded to the audio decoder 516. The audio decoder 516 may convert the audio packets to analog audio to drive a speaker system (e.g. stereo or home theater multiple channel audio systems) or other audio system (e.g. stereo or home theater multiple channel amplifier and speaker systems) or may simply provide decoded audio output. Video packets from the demultiplexer/descrambler circuit 514 (those identified with a video PID) are decrypted and forwarded to the video decoder 520. Similarly, data packets from the demultiplexer/descrambler circuit 514 (those identified with a data PID) are decrypted and forwarded to the data decoder 522.

The data decoder 522 processes and transmits data packets to the CPU 502 via the system bus 524. The video decoder 520 passes video data to the graphics processor 526. The graphics processor is computer-optimized to rapidly process graphics information. The graphics processor 526 is also coupled to the system bus 524 and operates under the control of the CPU 502.

Upon purchase of the set top box 500, a service provider may include a URL or IP address for the web-based access portal of the service provider. The set top box 500 may operate in a bi-directional communication mode. Accordingly, data and other information may be transmitted in both directions between the service provider and the set top box 500 using an out-of-band channel. In one embodiment, the data passes through the system bus 524, the modulator 518, and the tuner 510 (operating as a return path OOB tuner) to the transmission medium 508. This enables the set top box user to send information to the service provider, e.g., service requests, software updates, or changes and registration information.

The set-top box 500 may include any of a plurality of I/O (Input/Output) signals at the I/O interfaces 506 for interconnection with other devices. By way of example, and not limitation, a serial RS-232 signal may be provided at one port to enable interconnection to any suitable serial device supported by the set top box's internal software. Similarly, communication with appropriately compatible devices can be provided with the I/O interfaces via an Ethernet port, a USB (Universal Serial Bus) port, an IEEE 1394 (Firewire or I-Link) port, S-video port, or infrared port. These interfaces may be used to interconnect the set top box 500 with any of a variety of devices such as storage devices, audio/visual devices, gaming devices and Internet appliances. (not shown)

I/O interfaces 506 can further include a modem port to facilitate high speed or alternative access to the Internet or other data communication functions. In one embodiment, the modem port includes a DOCSIS (Data Over Cable System Interface Specification) cable modem. This modem facilitates high speed network access over a cable system when the port is appropriately coupled to a transmission medium embodied as a coaxial cable. A PS/2 or other keyboard/mouse/joystick coupled to a port may be used to enable data entry into the set top box 500. The set top box 500 also may include a basic video output port for direct connection to a television set. In one embodiment, a video output port can provide composite video formatted as National Television System Committee ("NTSC") video. In some embodiments, the video output port may be coupled directly to the graphics processor 526 or the demultiplexer/descrambler 514 rather than passing through the system bus 524 as illustrated in FIG. 5.

The input/output interfaces 506 may include the infrared port that may be embodied as an infrared receiver and may receive commands from an infrared remote control, infrared keyboard or other infrared control device. Although not shown, front panel controls may be used in some embodiments to directly control the operation of the set top box 500 through a front panel control interface coupled to the I/O interfaces 506. Selected interfaces such as those described above and others can be provided in the set top box 500 in various combinations as required or desired.

The set top box 500 also includes the disc drive 505 for storage of content and data as well as providing storage of programs (software code) for operating the CPU 502. The set top box 500 may also include other storage mediums such as a floppy disc drive, CD ROM drive, CD R/W drive, DVD drive, and others. The CPU 502 is coupled through the system bus 524 to the memory 504. The memory 504 may include any suitable memory technology including Random Access Memory (RAM), Read Only Memory (ROM), Flash memory, Electrically Erasable Programmable Read Only Memory (EEPROM), and others.

As previously mentioned, embodiments of the invention transmit SRMs to set top boxes, or other devices, using a protocol such as an MPEG-2 Systems-type protocol. In accordance with one embodiment, SRM data is incorporated by the content provider or distributor directly into an MPEG-2 Transport Stream. In particular, a Transport Stream Description Table is used to carry information pertinent to the SRM data. In this case, a descriptor is carried in the Transport Stream Description Table that identifies a PID value corresponding to TS packets carrying SRM data in the multiplex. The descriptor, which is an MPEG-2-type Registration Descriptor, carries an identifier ("format_identifier") with a value that is registered as identifying SRM data. The descriptor also includes a PID value, acting as a pointer to TS packets carrying SRM data.

Figure 6:
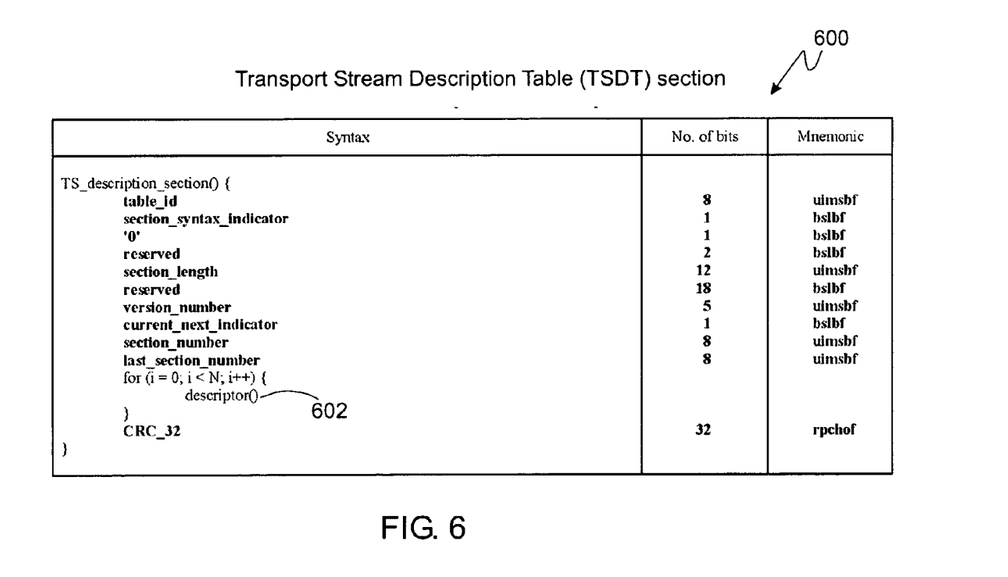
FIG. 6 is a syntax diagram for a transport stream description table section in accordance with an embodiment of the invention.

FIG. 6 shows the syntax for a TSDT section 600 in accordance with an embodiment of the invention. A descriptor field 602 is used for data corresponding to the Registration Descriptor which, in turn, includes an identifier ("format_identifier") (not shown) with a value that is registered as identifying SRM data. This Registration Descriptor data also includes a PID value (not shown) that points to TS packets carrying the SRM data.

In an alternative embodiment of the invention, an MPEG-2 Conditional Access Table (CAT) is used to carry information pertinent to the SRM data. The CAT includes an MPEG-2 Conditional Access descriptor, "CA_descriptor( )," with a registered value of "CA_system_id" that is known to correspond to SRM data. The descriptor also carries a PID value pointing to TS packets carrying SRM data.

Figure 7:
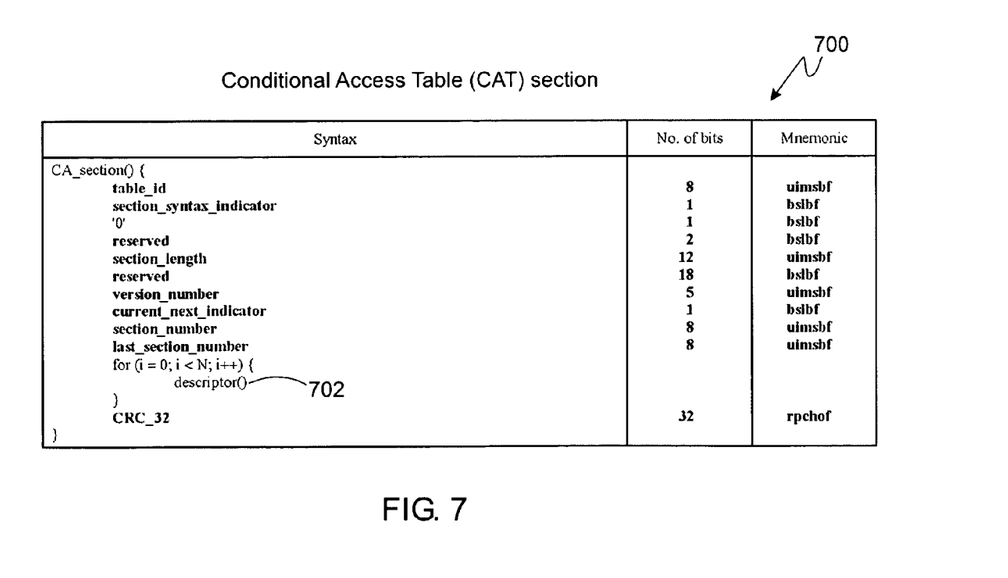
FIG. 7 is a syntax diagram for a conditional access table section in accordance with an embodiment of the invention.

FIG. 7 shows the syntax for a CAT section 700 in accordance with an embodiment of the invention. A descriptor field 702 is used for data corresponding to the Conditional Access descriptor, "CA_descriptor( )," which in turn, includes an identifier ("CA_system_id") (not shown) with a value that is registered as identifying SRM data. This Conditional Access descriptor data also includes a PID value (not shown) that points to TS packets carrying the SRM data Using either embodiment of FIG. 6 or FIG. 7, the TS packets identified in the TDST or CAT contain data that form another table that is used to carry the SRM data itself. This other table is a MPEG-2-type private table incorporating a MPEG-2-type long form table section syntax. For transmission purposes such a table can be divided into sections to facilitate the transmission of a relatively large quantity of data. Using this table, the field in the table_id_extension position (which is renamed "CP_provider_id") identifies a copy protection technology provider. This field is registered with the Advanced Television Systems Committee ("ATSC") code point registrar or other central authority.

Each SRM table instance (which is identified by a unique value of CP_provider_id) can be split into up to 256 table sections of 4096 bytes each. Thus the largest SRM table can be up to about 1 MB in length. If any copy protection technology needs more than 1 MB for an SRM, the copy protection technology provider can register multiple values for the CP_provider_id field. The 32-bit cyclical redundancy check (CRC) provided for each table section offers a measure of error detection capability. The payload (body) portion of the table structure is not defined by a standard, and therefore is defined by the particular copy protection provider.

Figure 8:
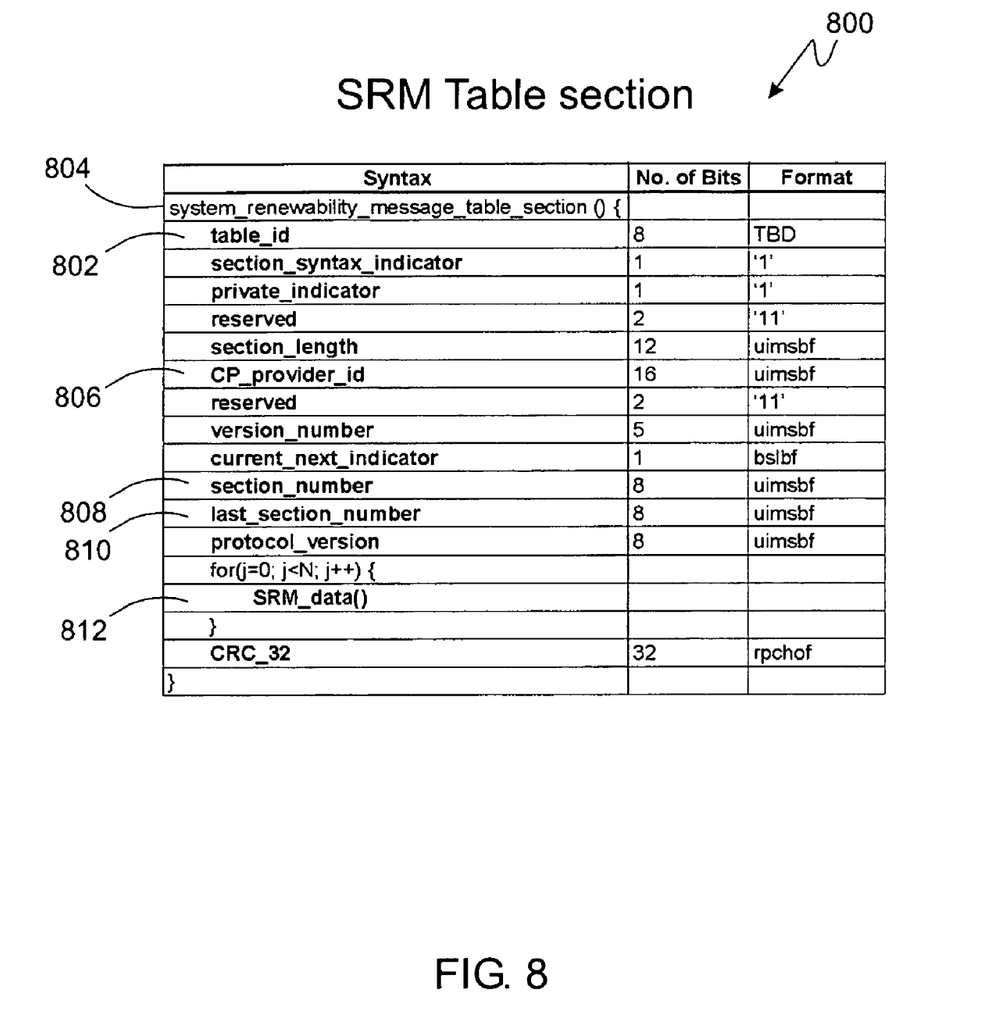
FIG. 8 is a syntax diagram for a SRM table section in accordance with an embodiment of the invention.

FIG. 8 shows a bit stream syntax for a SRM table section 800 using the MPEG-2 "long form" table section syntax in accordance with an embodiment of the invention. The "table_id" field 802 contains an 8-bit, unsigned integer number that indicates the type of table section being defined. For the "system_renewability_message_table_section( )" 804, the table_id is established by standards committees or other authorities. The "CP_provider_id" field 806 is a 16-bit field that identifies the copy protection technology provider associated with this table section. Values of CP_provider_id are assigned by the ATSC Code Point Registrar or other central authority. The "section_number" field 808 is an 8-bit field that gives the number of this table section. The "last_section_number" field 810 is an 8-bit field that specifies the number of the last table section. The "SRM_data( )" field 812 is data with a format that is defined by the copy protection technology provider identified in the "CP_provider_id" field 806. This "SRM_data( )" field 812 is the "payload" portion of the SRM table and contains the actual SRM list data.

In an alternative embodiment of the invention, all SRMs are transported in TS packets corresponding to one or more, well-known PID values that are established by industry convention for exclusive use by SRMs. Thus receiving devices can skip the step of using the TSDT or CAT to find the SRM PID or PIDs. However, even if there is agreement within an industry to use a fixed, well-known PID value, a pointer to this PID in either a CA_descriptor( ) in the CAT, or an MPEG-2 Registration Descriptor in the TSDT can still be used.

Thus it can be seen that embodiments of the invention allow the presence of SRMs within a MPEG-2-type TS to be signaled by the use of a descriptor within a Transport Stream Descriptor Table or a Conditional Access Table. This descriptor identifies one or more PID values corresponding to TS packets carrying SRM data. The descriptor may be an MPEG-2-type Registration Descriptor carrying a format_id value registered with a SMPTE-type registration authority to identify SRMs, or it may use other means to unambiguously establish a pointer to TS packets carrying SRM data. Alternatively, another MPEG-standard descriptor may be used to establish the presence of SRM data and point to a PID value. The MPEG CA_descriptor( ) is one such example.

Each SRM is formatted as an MPEG-2-type long-form private table section wherein each copy protection provider uses a unique value for the "CP_provider_id" field which is in the position of the "table_id_extension" field. A registration authority, such as an ATSC-type code point registrar, manages assignments of this field. The use of such unique values in the "CP_provider_id" field allows multiple SRM instances (corresponding to revocation lists associated with multiple copy protection technology providers) to be transported within TS packets of a given PID value. This allows a receiving device to forward all SRMs in the TS without the need to recognize and identify individual copy protection technology providers.

Figure 9:
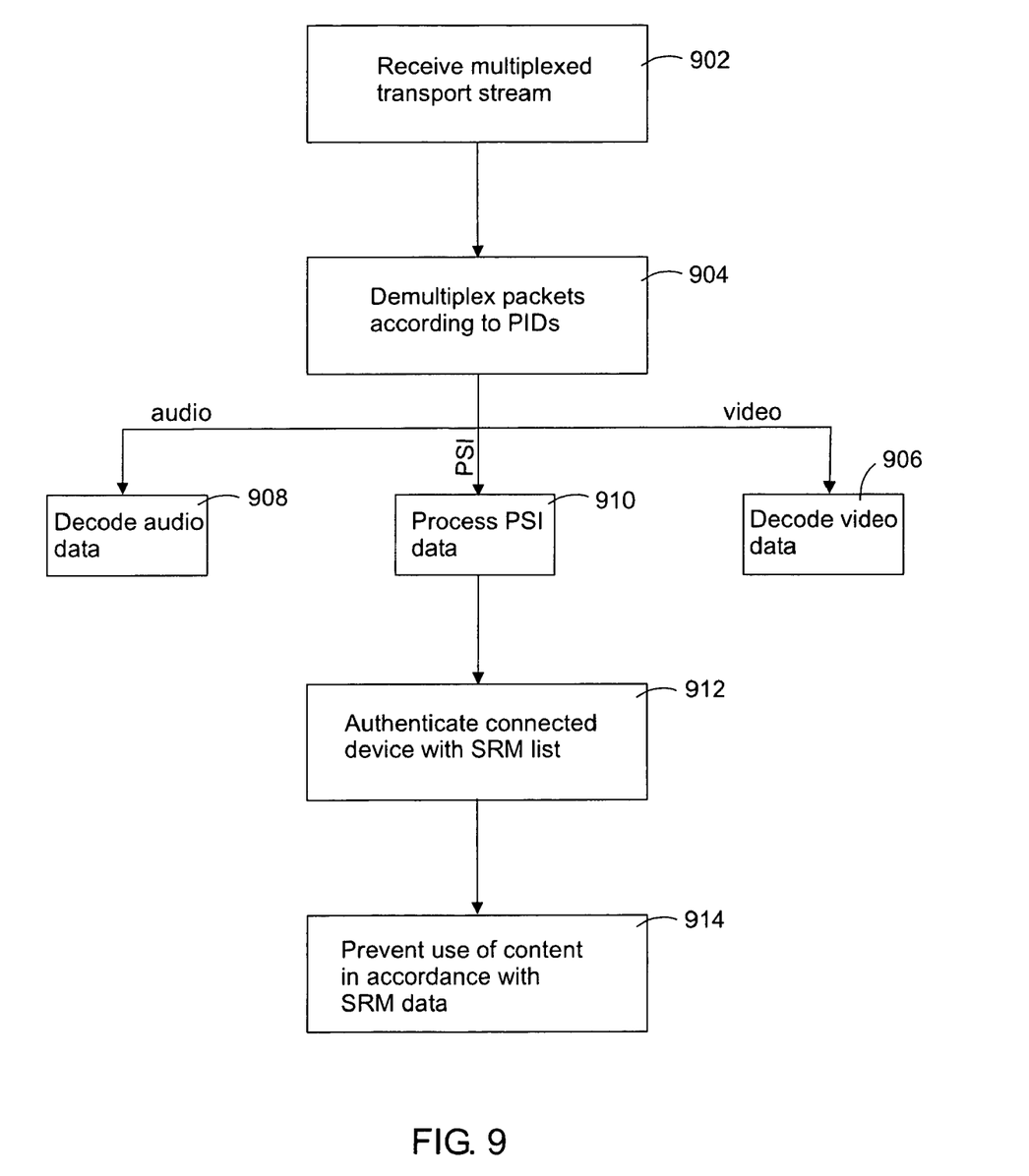
FIG. 9 is a flow chart of a process for controlling the use of content according to an embodiment of the invention.

FIG. 9 is a flow chart of a process for controlling the use of content according to an embodiment of the invention. A multiplexed transport stream is received by a receiving device from a content provider. (Step 902) The data packets are demultiplexed according to their PID values. (Step 904) Thus video data packets are directed to a video decoder for further processing. (Step 906) Similarly, audio data packets are directed to an audio decoder for further processing. (Step 908) Data packets having program specific information (PSI) data are sent to a data decoder which processes this data and forwards the data to a processor. (Step 910) SRM data that is included in the PSI data is compared with the identity of another device connected to the receiving device output that is a potential recipient of the protected content, thus authenticating this other device. (Step 912) If this other device has an identity that corresponds to an identity contained within the SRM data, then delivery of the content to that device is prevented. (Step 914)

Figure 2:
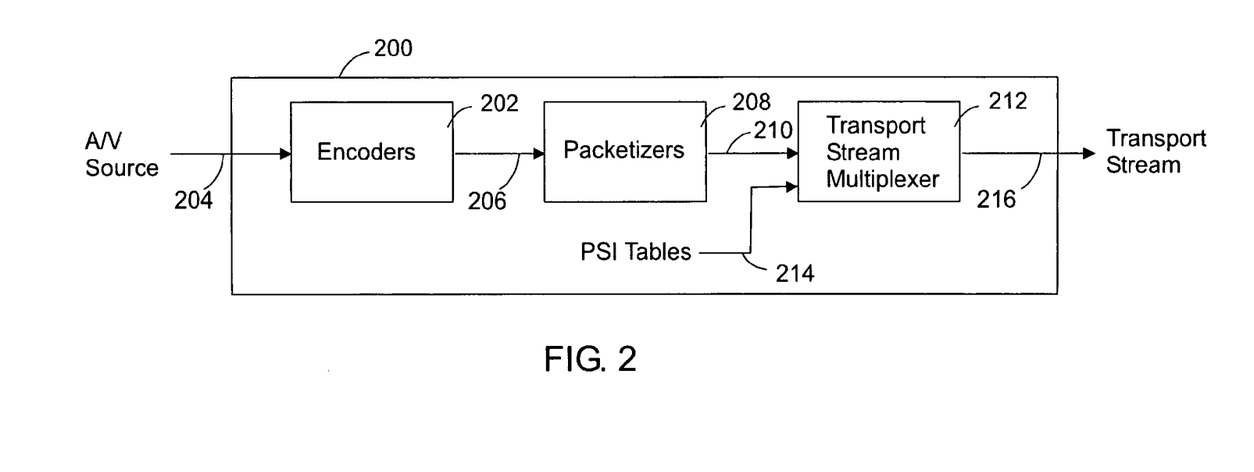
FIG. 2 is a high level block diagram of circuitry suitable for generating a transport stream.

FIG. 2 is a high-level block diagram of circuitry 200 suitable for generating a Transport Stream in accordance with embodiments of the invention. The circuitry 200 includes one or more encoders 202, which receive audio/video (A/V)

source material 204 and encode the source material 204 according to MPEG-2 audio/video compression standards. The encoders 202 may be circuitry that encodes audio, data, and video according to MPEG-2 standards and outputs the coded video, coded audio, or other coded bit streams as at least one elementary stream (ES) 206. The source material 204 may be a movie, a television program, a music video, a computer game, or other source material suitable for MPEG-2 encoding.

The elementary stream (ES) 206 is delivered to one or more packetizers 208 (typically an audio packetizer and a video packetizer), which packetizes the elementary stream (ES) 206 into a packetized elementary stream (PES) 210. The packetized elementary stream (PES) 210 is delivered to a Transport Stream (TS) multiplexer 212, which multiplexes individual packetized elementary streams (PES) 210 with each other and with any Program Specific Information (PSI) tables 214 [e.g., the Program Association Table (PAT), the Program Map Table (PMT), the Conditional Access Table (CAT), and the Transport Stream Description Table (TSDT)] to produce the Transport Stream (TS) 216.

Figure 3:
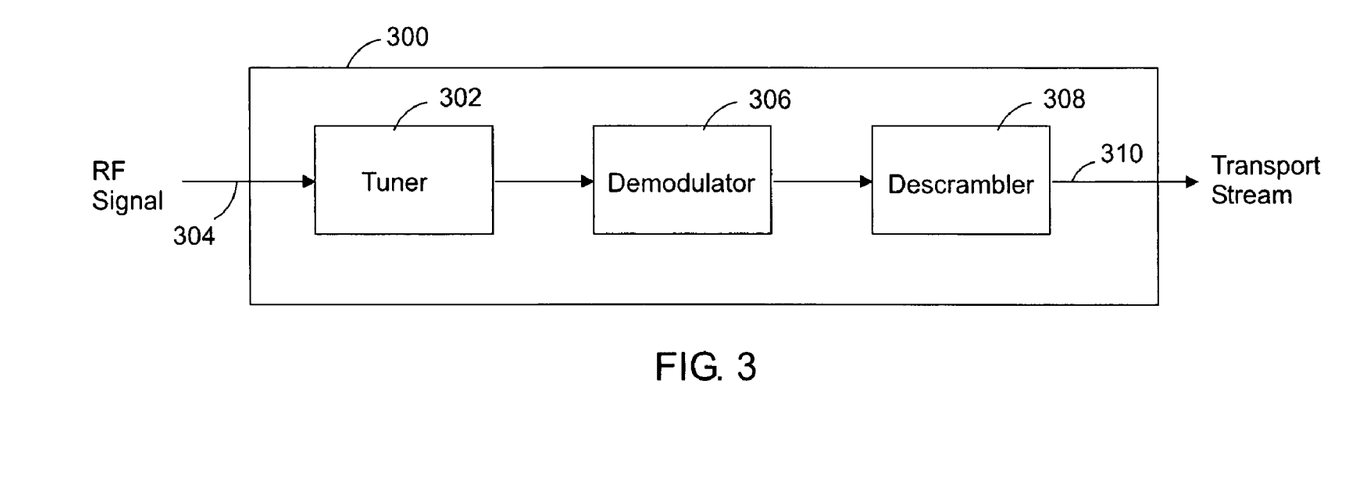
FIG. 3 is a high level block diagram of other circuitry suitable for generating a transport stream.

FIG. 3 is a high-level block diagram of circuitry 300 suitable for generating a Transport Stream. The circuitry 300 includes a tuner 302, which receives programming (e.g., movies, sports, news, and music) carried on a radio frequency (RF) signal 304 from a satellite dish, a cable, a terrestrial broadcast antenna, or any other RF signal source. The tuner 302 cleans the incoming RF signal 304 as needed to enable a demodulator 306 to recover the programming from the RF signal 304. A descrambler 308 descrambles the programming, if it has been scrambled prior to transmission, to produce the Transport Stream 310.

Figure 4:
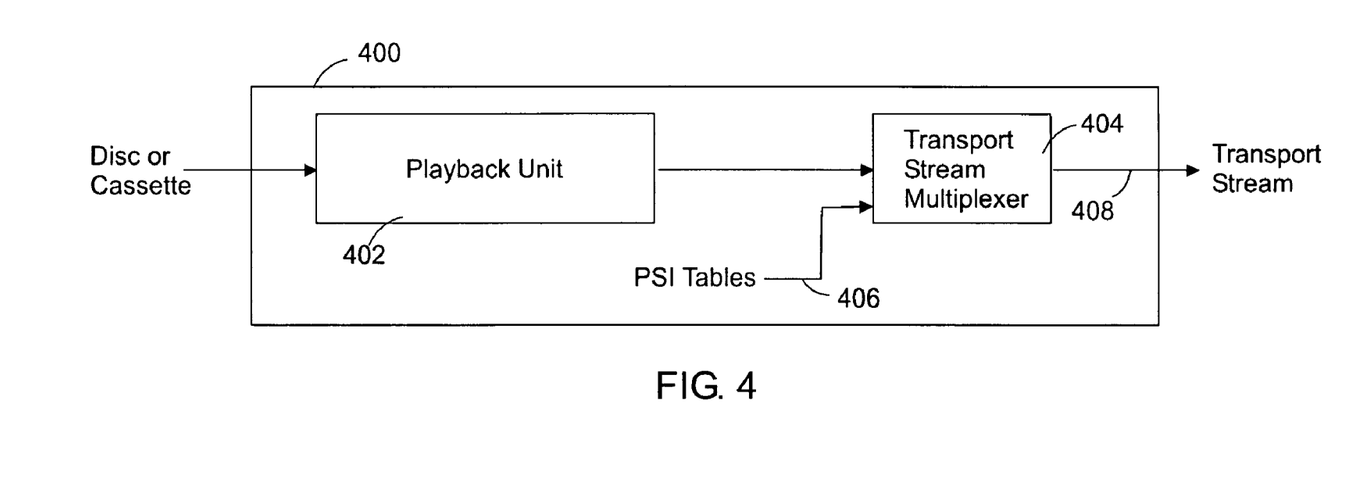
FIG. 4 is a high level block diagram of other circuitry suitable for generating a transport stream.

FIG. 4 is a high-level block diagram of circuitry 400 suitable for generating a Transport Stream. The circuitry 400 includes a playback unit 402, which receives programming (e.g., movies, sports, news, and music) from a video disc or a video cassette recorded according to MPEG-2 standards. The playback unit 402 is known circuitry (e.g., magnetic reader circuitry, optical reader circuitry) capable of delivering audio and video to a Transport Stream multiplexer 404. The Transport Stream (TS) multiplexer 404 multiplexes the output of the playback unit 402 with Program Specific Information (PSI) tables 406 [e.g., the Program Association Tables (PAT), the Program Map Table (PMT), and optionally the Conditional Access Table (CAT) and the Transport Stream Description Table (TSDT)] to produce the Transport Stream (TS) 408.

Embodiments of the invention can be implemented using hardware, software, or a combination of hardware and software. Such implementations include state machines and application specific integrated circuits (ASICs). In implementations using software, the software may be stored on a computer program product (such as an optical disk, a magnetic disk, a floppy disk, etc.) or a program storage device (such as an optical disk drive, a magnetic disk drive, a floppy disk drive, etc.).

The architectures of FIGS. 2-5 are not exclusive. Other architectures may be derived in accordance with the principles of the invention to accomplish the same objectives. Further, the function of the elements of the decoder 522 of FIG. 5 and the process steps of FIG. 9 may be implemented in whole or in part within the programmed instructions of a microprocessor. In addition, the principles of the invention apply to any form of MPEG or non-MPEG compatible content. A data stream formed according to the invention principles may be used in a variety of applications, including video server or PC type communications via telephone lines, for example. A program data stream with one or more components of video, audio and data formed to incorporate program specific information according to invention principles may be recorded on a storage medium and transmitted or re-broadcast to other servers, PCs or receivers.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method comprising:
   selecting from an MPEG-type transport stream a first plurality of packets according to an identifier that is referenced in a first table,
      wherein each packet of the first plurality of packets includes the identifier,
      wherein the first plurality of packets comprises data that form a data structure comprising a second table having a first field and a second field,
      wherein the first field is for containing an identity of one of a plurality of providers of copy protection technology, wherein the first field further is for enabling a creation of a plurality of instances of the second table when the first plurality of packets includes a plurality of identities of the plurality of providers of copy protection technology, wherein each of the plurality of instances is for a different identity of the plurality of identities of the plurality of providers of copy protection technology,
      wherein the second field is for containing identities of a plurality of devices that are unauthorized for use of content and wherein the plurality of devices are associated with the one of the plurality of providers of copy protection technology identified in the first field, and
      wherein the selecting of the first plurality of packets is performed by at least one central processing unit (CPU); and
   preventing the use of the content in accordance with the data of the first plurality of packets,
      wherein the MPEG-type transport stream further includes a second plurality of packets that include the content, and
      wherein none of the packets of the first plurality of packets contains the content.

2. The method of claim 1 wherein the first table comprises one of a transport stream description table and a conditional access table.

3. The method of claim 1 wherein the first table further includes a descriptor, and wherein the descriptor includes the identifier.

4. The method of claim 1 wherein the second table comprises an MPEG-2-type private table having an MPEG-2-type long form table section syntax.

5. The method of claim 1 wherein the identity of the one of the plurality of the providers of the copy protection technology corresponds to a value that is registered with a central authority.

6. The method of claim 5 wherein the central authority comprises an Advanced Television Systems Committee-type code point registrar.

7. A method for transmitting content, the method comprising:
   providing a transport stream in which the content is embodied, wherein the transport stream comprises a first plurality of data packets, a second plurality of data packets, and a third plurality of data packets, wherein the providing of the transport stream is performed by at least one processor;
   wherein the first plurality of data packets includes data that form a first table,
   wherein each data packet of the second plurality of data packets comprises an identifier,
   wherein the identifier is referenced in the first table,
   wherein the second plurality of data packets includes data that form a data structure comprising a second table having a first field and a second field,
   wherein the first field is for containing an identity of one of a plurality of providers of copy protection technology, wherein the first field further is for enabling a creation of a plurality of instances of the second table when the second plurality of data packets includes a plurality of identities of the plurality of providers of copy protection technology, wherein each of the plurality of instances is for a different identity of the plurality of identities of the plurality of providers of copy protection technology,
   wherein the second field is for containing identities of a plurality of devices that are unauthorized for the use of content and wherein the plurality of devices are associated with the one of the plurality of providers of copy protection technology identified in the first field,
   wherein the third plurality of data packets includes the content, and
   wherein none of the packets of the first and second plurality of packets contains the content.

8. An article of manufacture for preventing a use of content by a plurality of devices that are unauthorized for the use of the content and that have identities, the article of manufacture being for use by another device having a processing unit, the article of manufacture comprising:
   at least one non-transitory computer-readable storage medium containing instructions that, when executed by the processing unit, cause the processing unit to perform a method comprising:
   selecting from a transport stream a first plurality of packets according to an identifier that is referenced in a first table,
      wherein each packet of the first plurality of packets includes the identifier,
      wherein the first plurality of packets comprises data that form a data structure comprising a second table having a first field and a second field,
      wherein the first field is for containing an identity of one of a plurality of providers of copy protection technology, wherein the first field further is for enabling a creation of a plurality of instances of the second table when the first plurality of packets includes a plurality of identities of the plurality of providers of copy protection technology, wherein each of the plurality of instances is for a different identity of the plurality of identities of the plurality of providers of copy protection technology,
      wherein the second field is for containing the identities of the plurality of devices that are unauthorized for the use of the content and wherein the plurality of devices are associated with the one of the plurality of providers of copy protection technology identified in the first field, and
   preventing the use of the content in accordance with the data in the first plurality of packets,
      wherein the transport stream further includes a second plurality of packets that includes the content, and
      wherein none of the packets of the first plurality of packets contains the content.

9. The article of manufacture of claim 8 wherein the transport stream comprises an MPEG-type stream and wherein the first table comprises one of a transport stream description table and a conditional access table.

10. The article of manufacture of claim 8 wherein the identifier comprises a value that is established by industry convention.

11. A system for preventing a use of content by a plurality of devices that are unauthorized for the use of the content and that have identities, the system comprising:
    another device having a processing unit operable to execute software routines, and
    programming logic executed by the processing unit, wherein the programming logic comprises:
    means for providing a transport stream in which the content is embodied,
      wherein the transport stream comprises a first plurality of data packets, a second plurality of data packets, and a third plurality of data packets;
      wherein the first plurality of data packets includes data that forms a first table,
      wherein each data packet of the second plurality of data packets comprises an identifier,
      wherein the identifier is referenced in the first table,
      wherein the second plurality of data packets includes data that forms a data structure comprising a second table having a first field and a second field,
      wherein the first field is for containing an identity of one of a plurality of providers of copy protection technology, wherein the first field further is for enabling a creation of a plurality of instances of the second table when the second plurality of data packets includes a plurality of identities of the plurality of providers of copy protection technology, wherein each of the plurality of instances is for a different identity of the plurality of identities of the plurality of providers of copy protection technology,
      wherein the second field is for containing the identities of the plurality of devices that are unauthorized for the use of the content and wherein the plurality of devices are associated with the one of the plurality of providers of copy protection technology identified in the first field,
      wherein the third plurality of data packets includes the content, and
      wherein none of the packets of the first and second plurality of packets contains the content.

12. The system of claim 11 wherein transport stream comprises an MPEG-type stream and wherein the first table comprises one of a transport stream description table and a conditional access table.

13. The system of claim 11 wherein the second table comprises an MPEG-2-type private table having an MPEG-2-type long form table section syntax.

14. A data structure stored on a non-transitory computer-readable storage medium, wherein the data structure is for use with a first table, for use with identities of a plurality of devices that are unauthorized for use of content, and for use with an identity of at least one of a plurality of providers of copy protection technology, the data structure comprising:

a second table having a first field and a second field,
wherein the second table is formed from a plurality of packets of an MPEG-type transport stream, wherein each of the plurality of packets includes an identifier, wherein the identifier is referenced in the first table,
wherein the first field of the second table is for containing the identity of the at least one of the plurality of providers of copy protection technology, wherein the first field further is for enabling a creation of a plurality of instances of the second table when the plurality of packets includes a plurality of identities of the plurality of providers of copy protection technology, wherein each of the plurality of instances is for a different identity of the plurality of identities of the plurality of providers of copy protection technology;
wherein the second field of the second table is for containing the identities of the plurality of devices that are unauthorized for the use of the content, wherein the plurality of devices are associated with the at least one of the plurality of providers of copy protection technology identified in the first field.

15. The data structure of claim 14 wherein the first table comprises one of a transport stream description table and a conditional access table.

16. The data structure of claim 14 wherein the first table further includes a descriptor, and wherein the descriptor includes the identifier.

17. The data structure of claim 14 wherein the second table comprises an MPEG-2-type private table having an MPEG-2-type long form table section syntax.

18. The data structure of claim 17 wherein the first field is a table id extension field that has been assigned another name.

19. The data structure of claim 14 wherein the identity of the at least one of the plurality of providers of copy protection technology corresponds to a value that is registered with a central authority.

20. The data structure of claim 19 wherein the central authority comprises an Advanced Television Systems Committee-type code point registrar.

21. The data structure of claim 14 wherein the identifier that is referenced in the first table is a 13-bit Packet Identifier (PID)-type identifier.

* * * * *

UNITED STATES PATENT AND TRADEMARK OFFICE
CERTIFICATE OF CORRECTION

| | |
|---|---|
| PATENT NO. | : 8,015,613 B2 |
| APPLICATION NO. | : 11/229225 |
| DATED | : September 6, 2011 |
| INVENTOR(S) | : Eyer |

It is certified that error appears in the above-identified patent and that said Letters Patent is hereby corrected as shown below:

In the Claims:

Claim 18, column 14, line 11, delete "table id extension" and insert --table_id_extension--.

Signed and Sealed this
Twentieth Day of December, 2011

David J. Kappos
*Director of the United States Patent and Trademark Office*